United States Patent
Hetzler et al.

(10) Patent No.: US 9,827,828 B2
(45) Date of Patent: Nov. 28, 2017

(54) VEHICLE HEATING SYSTEM

(75) Inventors: Jürgen Hetzler, Offenbach (DE); Norbert Ernst, Billigheim (DE)

(73) Assignee: BORGWARNER BERU SYSTEMS GMBH, Ludwigsburg (DE)

( * ) Notice: Subject to any disclaimer, the term of this patent is extended or adjusted under 35 U.S.C. 154(b) by 1510 days.

(21) Appl. No.: 12/459,955

(22) Filed: Jul. 10, 2009

(65) Prior Publication Data

US 2010/0012640 A1   Jan. 21, 2010

(30) Foreign Application Priority Data

Jul. 15, 2008   (DE) .................. 10 2008 033 142

(51) Int. Cl.
| | |
|---|---|
| *H05B 3/50* | (2006.01) |
| *B60H 1/22* | (2006.01) |
| *F24H 3/04* | (2006.01) |
| *F24H 9/18* | (2006.01) |

(52) U.S. Cl.
CPC ......... *B60H 1/2225* (2013.01); *F24H 3/0405* (2013.01); *F24H 3/0429* (2013.01); *F24H 9/1863* (2013.01); *F24H 9/1872* (2013.01); *H05B 3/50* (2013.01); *B60H 2001/2278* (2013.01); *H05B 2203/023* (2013.01)

(58) Field of Classification Search
CPC ................ H05B 3/00; H05B 2203/003; H05B 2203/017; E05B 17/0016; B64D 15/12
USPC ................ 219/201, 202, 536–541, 504, 505; 338/22 R See application file for complete search history.

(56) References Cited

U.S. PATENT DOCUMENTS

| | | | |
|---|---|---|---|
| 4,939,349 A * | 7/1990 | Liu .............................. | 219/552 |
| 5,239,163 A | 8/1993 | Brouwers | |
| 5,471,034 A * | 11/1995 | Kawate et al. ............... | 219/485 |
| 6,180,930 B1 * | 1/2001 | Wu ............................... | 219/530 |
| 6,452,506 B2 | 9/2002 | Wilhelm | |
| 7,026,584 B2 | 4/2006 | Bohlender | |
| 7,064,301 B2 | 6/2006 | Han et al. | |
| 7,098,426 B2 | 8/2006 | Bohlender et al. | |
| 7,297,901 B2 | 11/2007 | Lee | |
| 2005/0056637 A1 * | 3/2005 | Bohlender et al. .......... | 219/536 |
| 2007/0068913 A1 * | 3/2007 | Zeyen et al. .................. | 219/201 |
| 2008/0000889 A1 | 1/2008 | Niederer et al. | |

(Continued)

FOREIGN PATENT DOCUMENTS

| | | |
|---|---|---|
| DE | 4404345 A1 | 8/1994 |
| DE | 197 06 199 A1 | 8/1998 |

(Continued)

OTHER PUBLICATIONS

Machine translation of WO 2005004538, Mar. 2012.*

Primary Examiner — Tu B Hoang
Assistant Examiner — Thomas Ward
(74) Attorney, Agent, or Firm — Hackler Daghighian Martino & Novak

(57) ABSTRACT

The description relates to a vehicle heating system having at least one heat transfer device through which air can flow to be heated and at least one heating device which is attached to the heat transfer device and which each involves at least one heating element arranged between two contact plates, said heating element being held by a positioning frame which is attached to one of the contact plates. The contact plates of the heating devices are each held in a positioning frame to which they are attached.

16 Claims, 4 Drawing Sheets

(56) References Cited

U.S. PATENT DOCUMENTS

2008/0073336 A1   3/2008  Bohlender et al.
2009/0139983 A1*  6/2009  Luppold et al. .............. 219/530

FOREIGN PATENT DOCUMENTS

| | | |
|---|---|---|
| DE | 198 46 169 A1 | 4/2000 |
| DE | 44 04 345 B4 | 5/2006 |
| DE | 60 2004 002 556 T2 | 1/2007 |
| EP | 0 162 623 A1 | 11/1985 |
| EP | 1 432 287 A1 | 6/2004 |
| EP | 1429084 A1 | 6/2004 |
| EP | 1 452 357 A1 | 9/2004 |
| EP | 1503153 A1 | 2/2005 |
| EP | 1 580 495 A1 | 9/2005 |
| EP | 1 780 061 A1 | 5/2007 |
| EP | 1780061 A1 | 5/2007 |
| EP | 1 872 986 A1 | 1/2008 |
| GB | 2 322 275 A | 8/1998 |
| WO | WO 2005004538 A1 * | 1/2005 ............. H05B 3/50 |
| WO | WO 2006/059960 A1 | 6/2006 |
| WO | 2006 059960 A1 | 8/2006 |
| WO | 2007 071335 A1 | 6/2007 |

* cited by examiner

VEHICLE HEATING SYSTEM

The invention relates to a vehicle heating system comprising a heating devices and a heat transfer devices attached to it. Such a system is, for example, known from EP 1 768 457 A1.

The vehicle heating system known from EP 1 768 457 A1 is provided with two contact plates between which a positioning frame with PTC heating elements is arranged. The positioning frame is engaged to the contact plates.

It is an object of the present invention to show a way of simplifying the manufacture of a vehicle heating system.

SUMMARY OF THE INVENTION

This problem is solved by a vehicle heating system comprising the features presented in Claim 1. Advantageous further developments of the invention are the subject matter of the subordinate claims.

A vehicle device according to the invention is provided with not only one but two positioning frames which hold the at least one heating element. For this reason, the contact plates can be fixed to the positioning frames in a preceding manufacturing step. The positioning frames can hold the contact plates by engaging around their longitudinal edges. For example, the positioning frames can be injection molded around the contact plates or the positioning frames can be clicked or pushed onto the contact plates. In this manner, the assembly of the vehicle heating system can be simplified because fewer components have to be handled. Advantageously, PTC elements, two positioning frames and two contact plates can be pre-assembled to form a unit.

The contact plates and the positioning frames attached thereto can, advantageously, be shaped in an equal manner, with the result that the number of different component required is reduced. This simplifies stockpiling and allows reduction of costs.

The positioning frames can form a receptacle for the heating element or the heating elements. To assemble the heating devices, the heating elements, which are preferably rectangular PTC elements, are just placed into the receptacles provided to this end and are subsequently covered with a second contact plate which carries a positioning frame which is, preferably, formed in an equal manner. Therein, the depth of the positioning frames should be equal to or somewhat less than the half of the thickness of the heating elements. Preferably, the positioning frames are provided with clamping noses for clamping or friction-locking the PTC elements.

Suitable positioning frames can be made of plastic or polymer ceramic and can be clicked into place on the contact plates, pushed onto the contact plates, or injection-molded around the contact plates.

Preferably, the positioning frames leave a rear side of the contact plates open, said rear side facing away from the heating elements. This rear side of the contact plates is, preferably, covered with an electrically insulated lining, for example with a strip made of Kapton film or an electrically insulating ceramic material. In order to obtain a particularly good insulation, it is also possible to place a plurality of strips made of the same or of a different material one on top of the other.

An electric insulation of the contact plates can be achieved by means of the material of a positioning frame covering the rear side, for example polyamide. However, injection-moldable materials usually cause a considerable thermal insulation as well. By electrically insulating the contact plates by means of a separate lining, the electric insulation can be combined with an advantageously higher thermal conductivity and, thus, enhanced thermal coupling of the heating device to the heat transfer device.

The positioning frames may enclose the heating elements in a fluid-tight manner. Particularly if the contact plates and the heating elements are not arranged in tubes or the tubes are not fluid-tight, the positioning frames can advantageously prevent any contact between the fluid to be heated and the heating elements. For example, the two positioning frames of a heating device can be adjacent to each other in a sealing manner. It is also possible that a seal is arranged between the insulating frames.

In a vehicle heating system according to the invention, the heat transfer device or heat transfer devices is/are provided with heating device receptacles in which the heating devices are arranged. For example, the heating device receptacles can be formed as open channels, into which the heating devices and/or their components are inserted. Such channels can, for example, have a U-shaped cross-section. Preferably, however, the heating device receptacles have openings into which the heating devices are inserted.

A particularly easy and cost-effective manufacture can be realized by means of heating device receptacles provided on the heat transfer devices. That is to say that, in this manner, the attachment of the heating devices to the heat transfer device can be achieved without much of an effort. In particular, the heat transfer devices can advantageously be used to hold the individual elements of the heating devices, i.e. their contact plates with heating elements arranged therebetween, together. Thereby, the structure of the heating devices can be simplified; it is, in particular, possible to do without complex soldering or glueing of the contact plates of the heating devices to the heating elements. Furthermore, the heating devices can be locked in position in the heating device receptacles of the heat transfer devices in a clamping manner, with the result that manufacture can be simplified in this respect as well.

Preferably, a vehicle heating system is provided with a plurality of heat transfer devices which are arranged in series as seen in the flow direction of the fluid to be heated.

Preferably, the heating devices of neighboring heat transfer devices are, therein, arranged in a staggered manner in relation to the flow direction. In this manner, a particularly efficient heat transfer to air flowing through the heat transfer devices can be achieved. If heat transfer devices of equal shape are used, a staggered arrangement of the heating devices can be achieved by arranging neighboring heat transfer devices differently in relation to the flow direction. For example, neighboring heat transfer devices can be arranged in a laterally staggered manner in relation to the flow direction. A further possibility of a staggered arrangement of the heating devices is to arrange neighboring heat transfer devices with reverse orientation in relation to the flow direction, that is to say such that the air flows towards the front side of one heat transfer device whereas another heat transfer device arranged downstream thereof faces the air flow with its rear side.

Preferably, the heat transfer devices comprise tubes into the openings of which the heating devices are inserted. In this manner, the heat transfer devices can be thermally coupled to the heating devices in a particularly efficient manner, especially if the tubes are compressed after the heating devices have been inserted. In this embodiment, a tight connection of the positioning frames is to no advantage. It is, however, advantageous to seal the end of the tubes.

An advantageous further development of the invention provides that the heat transfer devices are extruded profiles. Preferably, they comprise holes through which air can flow in transverse direction in relation to the extrusion direction. The extrusion direction is the same as the longitudinal direction of the heating devices. In an extruded profile, suitable holes can, for example, be made without much effort by means of a punching process. The use of extruded profiles as heat transfer devices allows cost-effective manufacture because laborious assembly of the heat transfer device from a large number of single components can be avoided. In contrast to traditional heat exchangers which are built of sheet-metal fins, it is, therefore, possible to achieve significant simplification. Furthermore, extruded profiles can be made as tubes extending in extrusion direction without any additional effort. The heating devices can be inserted in the openings of said tubes.

The extruded profiles preferably used as heat transfer devices are, preferably, provided with a base plate in which the holes for air flow are provided. Fins for heat transfer can extend from such a base plate on one side or either side thereof. Preferably, the extruded profile has only one single plate. However, it is also possible to use extruded profiles with two plates which are, for example, arranged in parallel and which are connected via heat transfer fins or intermediate walls arranged therebetween.

Preferably, each heat transfer device of a vehicle heating system according to the invention comprises a plurality of heating device receptacles. It is, however, also possible to provide a heat transfer device with only one single heating device receptacle. Heat transfer devices of a vehicle heating system according to the invention can be arranged in parallel rows and a plurality of such rows can be arranged in series as seen in flow direction.

Another advantageous further development of the invention provides that a plurality of contact rails extend in parallel in transverse direction in relation to the flow direction, wherein both contact plates of each heating device are each connected to one of two neighboring contact rails. These contact rails can be alternately connected to the positive and negative pole, respectively, of a voltage source. This alternation in flow direction results in a simple and clear circuit arrangement.

Another advantageous further development of the invention provides that the two contact plates of each heating device are electrically isolated from the heat transfer devices. In this manner, increased safety can be achieved which is, in particular, advantageous for higher supply voltages of, for example, 400 volts. That is to say that, by electrically isolating both contact plates from the heat transfer devices, the heat transfer devices can be connected to ground potential. Thereby the heat transfer devices are prevented from being energized by an electrical potential in the event of a defect.

BRIEF DESCRIPTION OF THE DRAWINGS

Further details and advantages of the invention will be illustrated by means of an exemplary embodiment with reference being made to the enclosed drawings. In the drawings.

DETAILED DESCRIPTION

Figure 1:
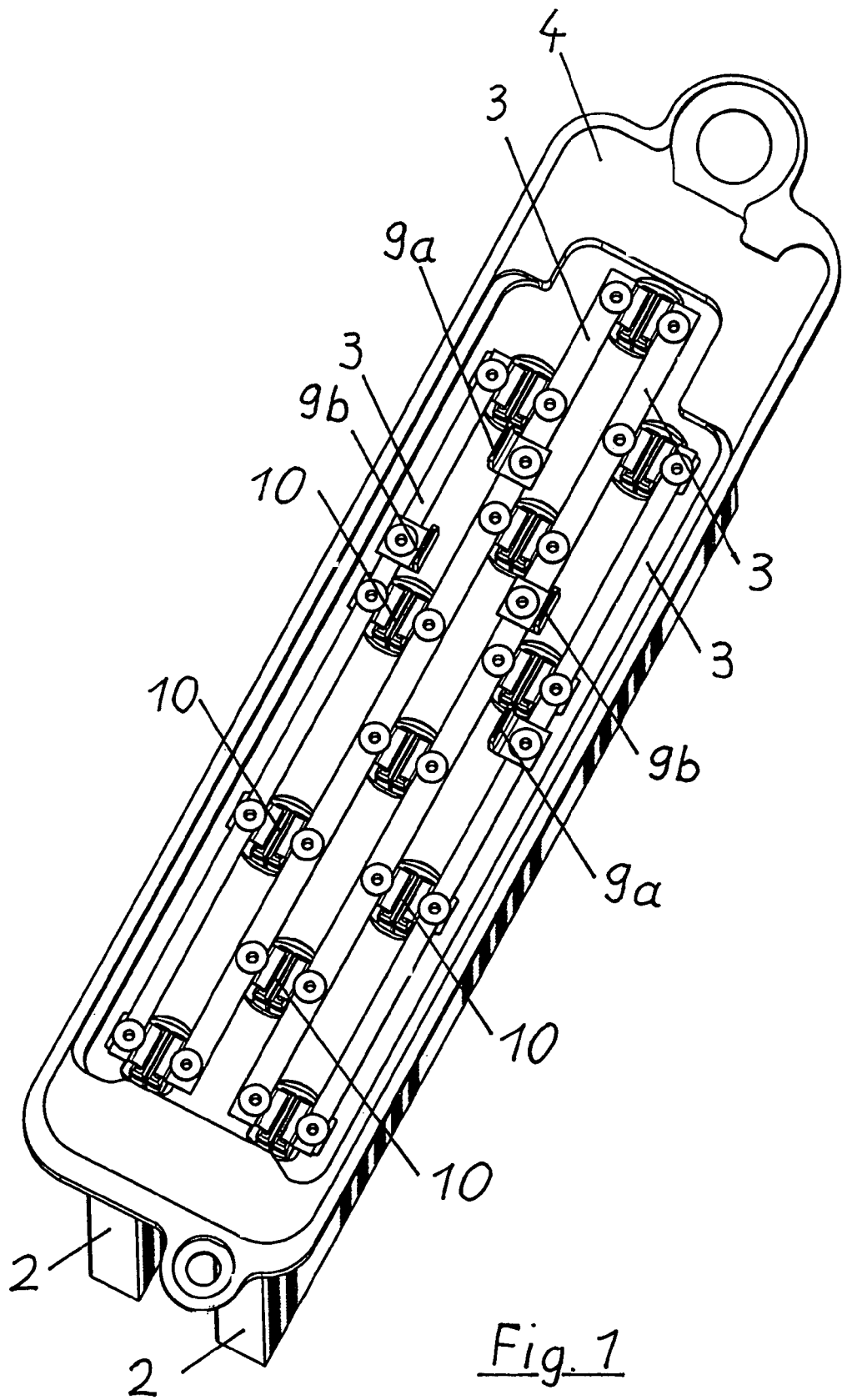
FIG. 1 shows an exemplary embodiment of a vehicle heating system according to the invention.
Figure 4:
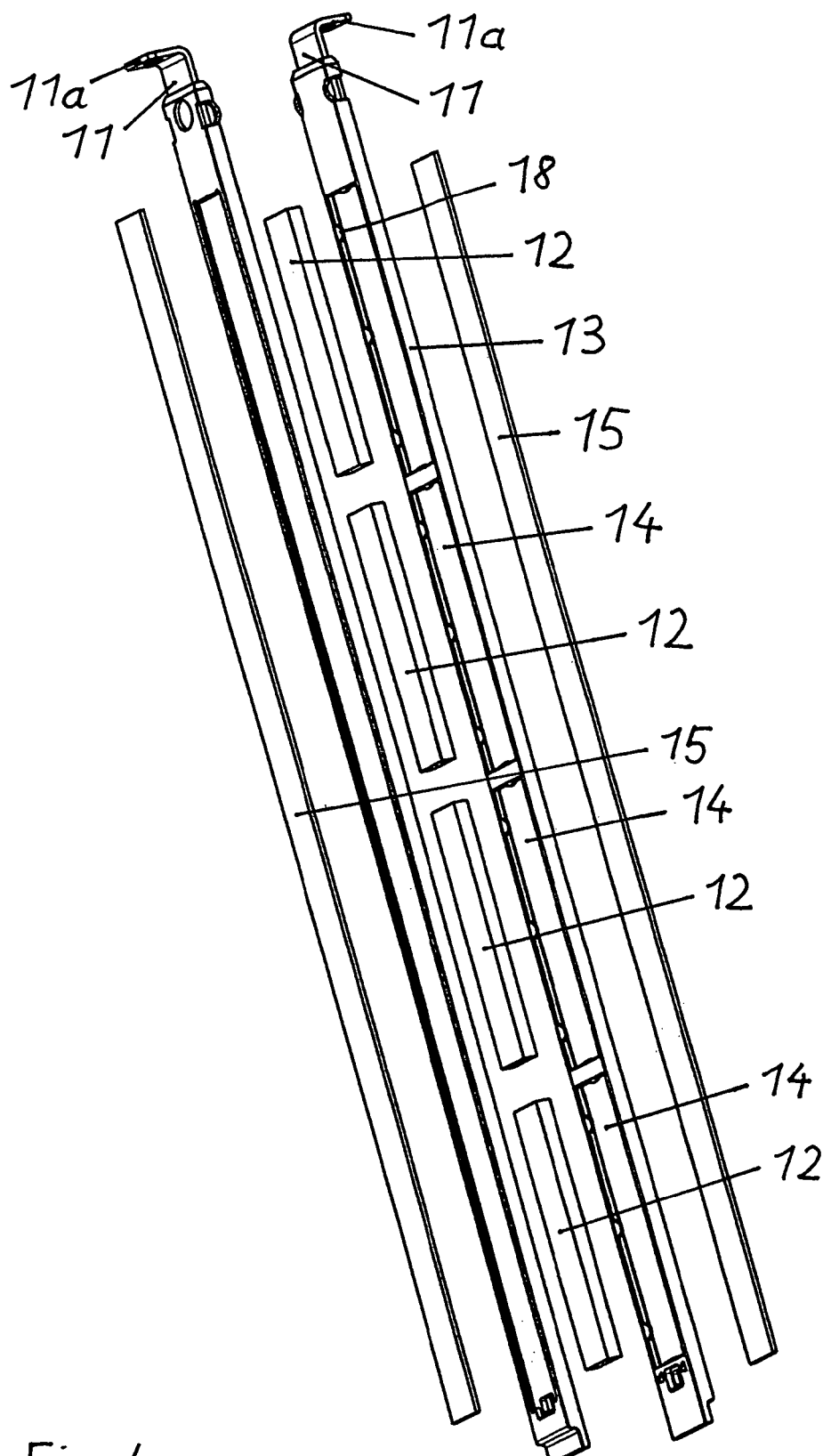
FIG. 4 shows an exploded view of a heating device of the vehicle heating system shown.

FIG. 1 shows an embodiment of a vehicle heating system 1 comprising a plurality of heat transfer devices 2 through which air can flow to be heated. The heat transfer devices 2 are arranged in series as seen in flow direction. The heat transfer devices 2 are provided with heating device receptacles with openings into which heating devices 10 are stuck. The structure of said heating devices 10 is shown in FIG. 4. The heating devices 10 are connected to contact rails 3 which extend perpendicular to the flow direction and are to be alternately connected to the poles of a voltage source. The heat transfer devices 2 with the heating devices 10 attached thereto are connected to form an assembly, this being achieved by means of a holder 4.

The holder 4 can, for example, be made of plastic or metal, in particular of aluminum. In the exemplary embodiment shown, the holder 4 is made of metal and can therefore advantageously be used for electrically grounding the heat transfer devices 2. Preferably, the holder 4 is connected to the heat transfer devices 2 in a clamping, i.e. friction-locking manner. As an alternative or in addition, it is also possible to attach the heat transfer devices 2 to the holder 4 in a positive manner, for example by screwing or snapping into place.

Figures 2, 3:
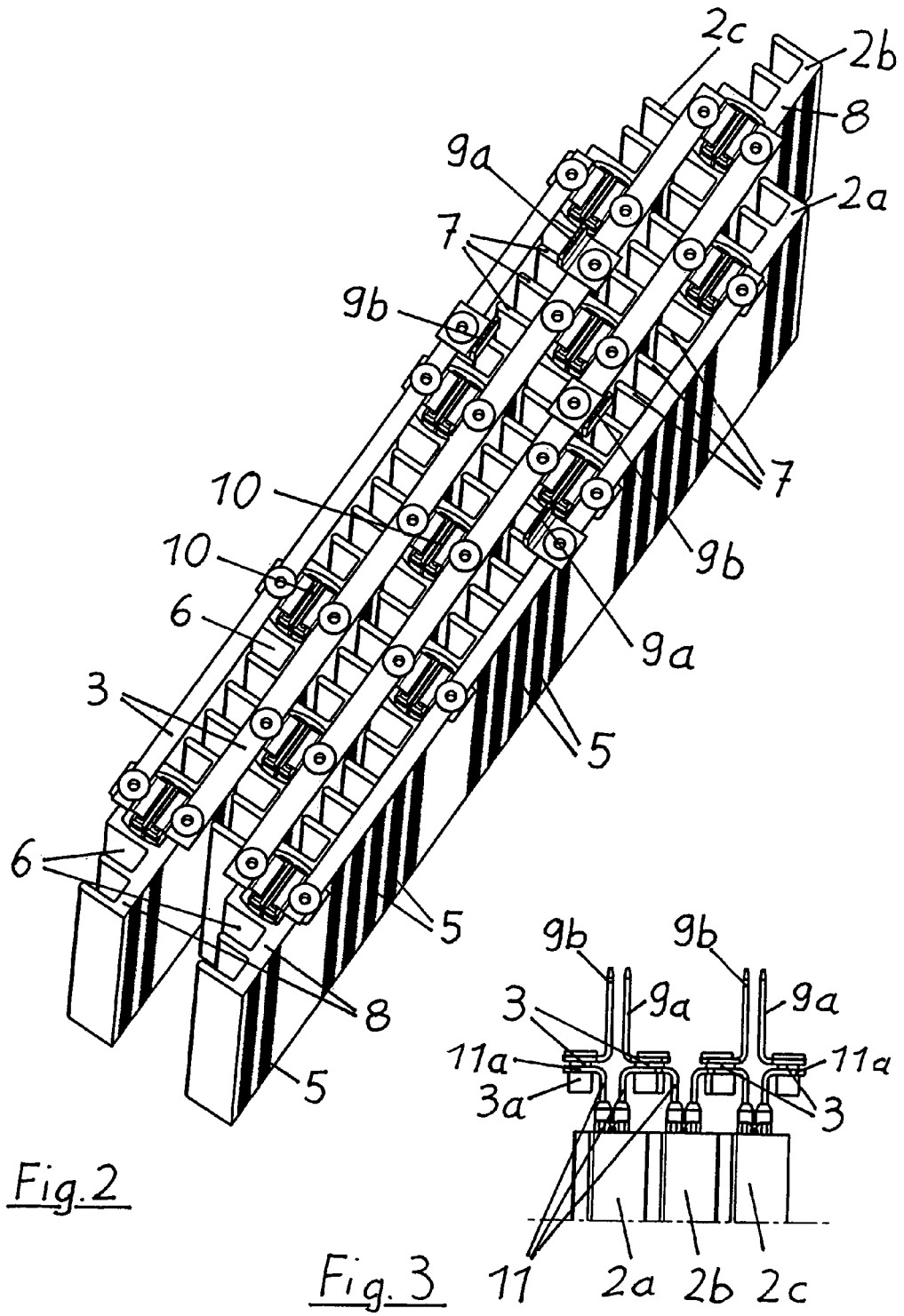
FIG. 2 shows the heat transfer devices of the exemplary embodiment shown in FIG. 1, along with the heating devices and contact rails attached to said heat transfer devices.
FIG. 3 shows a detail of a lateral view of FIG. 2.

FIG. 2 shows the vehicle heating system shown in FIG. 1 without the holder. As can be seen from FIG. 2, the vehicle heating system comprises three identical heat transfer devices 2a, 2b, 2c, which are arranged in series as seen in flow direction. Therein, neighboring heat transfer devices 2a, 2b, 2c are arranged in a staggered manner transverse to the flow direction. This is to advantage in that the heating devices 10 of neighboring heat transfer devices 2a, 2b, 2c are also arranged in a staggered manner with respect to the flow direction, this resulting in an enhanced heat output to the air flow.

In the embodiment shown, the heat transfer devices 2a, 2b, 2c are extruded profiles which have holes 5 through which air can flow transverse to the direction of extrusion. In the embodiment shown, these holes 5 are only shown schematically by means of strip-like sections of the extruded profile. A plurality of holes 5 is arranged in the strip-like sections. For example, the holes 5 can be punched into the extruded profile and can be of almost any shape desired. Circular or slotted holes are particularly suitable.

The extruded profiles 2a, 2b, 2c each comprise a plurality of tubes 6, into which the heating devices 10 are inserted. The tubes 6 or the openings of these rectangular tubes 6, thus, form receptacles for the heating devices 10.

The extruded profiles 2a, 2b, 2c have heat transfer fins 7 which extend from a base plate 8. The holes 5 through which air to be heated can flow are provided in said base plate 8. In the embodiment shown, heat transfer fins 7 each extend from only one side of this plate 8. However, it is also possible that heat transfer fins 7 extend from both sides of the plate 8.

FIG. 3 shows a detail of a lateral view of FIG. 2 as seen perpendicular in relation to the flow direction and perpendicular in relation to the extrusion direction of the heat transfer devices 2a, 2b, 2c. The aforementioned contact rails 3 can be recognized more clearly in FIGS. 1 and 2. Apart from the contact rails 3 which are the foremost as seen in flow direction and the backmost as seen in flow direction, each contact rail 3 is connected to heating devices 10 of two neighboring heat exchangers 2a, 2b, 2c. Electric connectors 9a, 9b are attached to the contact rails 3. The connectors 9a are for connection to the negative pole and the connectors 9b to the positive pole of a voltage source. Then electric current flows through heating devices 10 of neighboring heat exchangers 2a, 2b, 2c in opposite direction.

The structure of the heating devices 10 can be seen from FIG. 4. The heating devices 10 each have two equal contact plates 11, between which a plurality of rectangular heating elements 12 made of PTC ceramic (positive temperature coefficient) is arranged. The contact plates 11 each carry a positioning frame 13 which defines receptacles 14 for the heating elements 12. The positioning frame 13 is, preferably, made of plastic and can be pushed onto the contact plates 11. The positioning frame 13 can, however, also be injection-molded around the contact plates 11. The positioning frame 13 has clamping noses 18 which are arranged on inner sides surrounding the receptacles 14 and lock the inserted heating elements in position in a clamping manner.

Advantageously, the contact plates 11, positioning frames 13 and heating elements 12 can be pre-assembled to form a unit which can be easily handled.

As can be seen from FIG. 4, the positioning frame 13 leaves a rear side of the contact plates 11 open in the exemplary embodiment shown, said rear side facing away from the heating elements 12. On their side facing away from the heating elements 12, the contact plates 11 carry an electrically insulating lining which, in the exemplary embodiment shown, is made of a strip of Kapton film or ceramic. However, the insulation can also be formed by the positioning frame 13 or wrapping with a plastic film, for example Kapton film. Preferably, use is made of a lining 15 which is wrapped with film as an additional insulation. A film wrapped around can hold the components of a pre-assembled heating device 10 together, with the result that the latter can be handled more easily.

The ends 11a of the contact plates 11 are connected to the contact rails 3 and are bent off. These ends 11a can, for example, be attached to the contact rails 3 by means of rivets 3a or screws.

Figure 5:
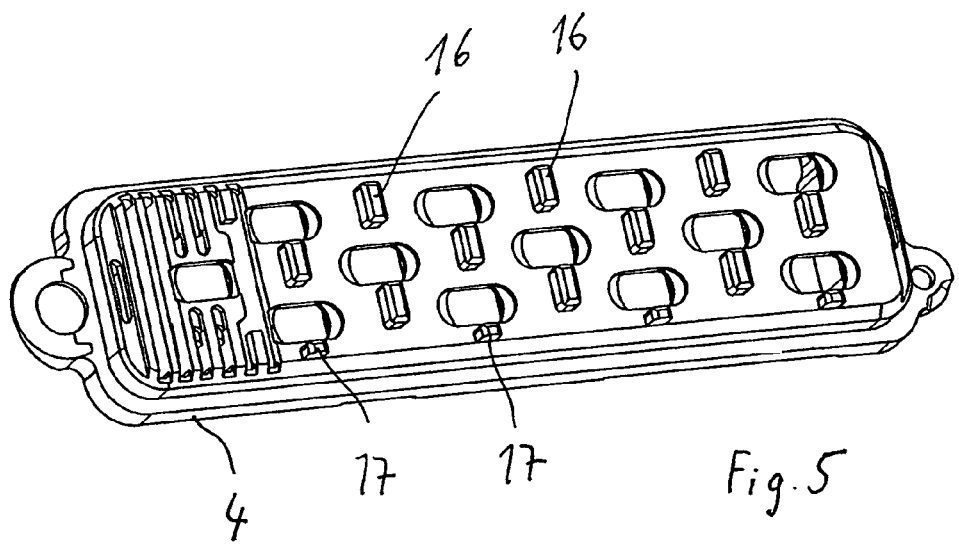
FIG. 5 shows the holder of the exemplary embodiment shown in FIG. 1.
Figure 6:
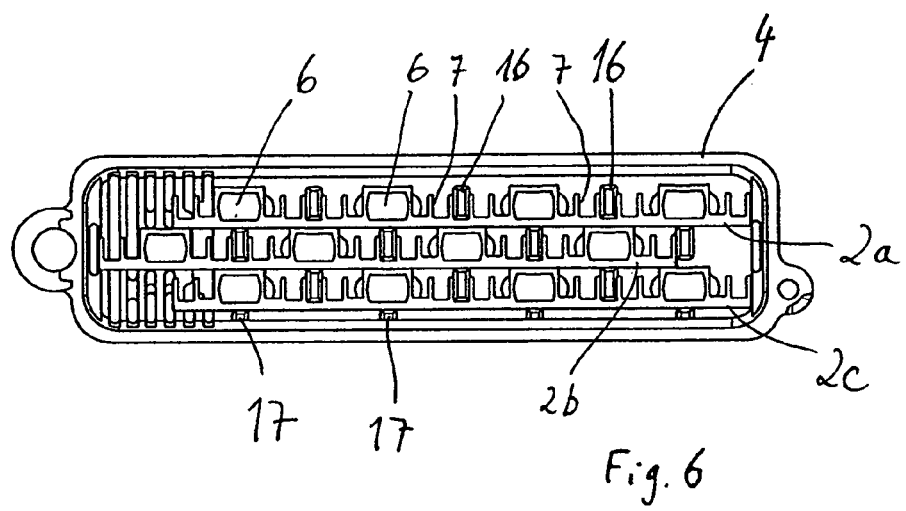
FIG. 6 shows the holder shown in FIG. 5, including heat transfer devices attached thereto.

FIGS. 5 and 6 show the holder 4 from below, with its bottom side facing the heat transfer devices 2a, 2b, 2c in the assembled state. FIG. 5 shows the holder 4 without heat transfer devices 2a, 2b, 2c; FIG. 6 with heat transfer devices 2a, 2b, 2c. The holder 4 is connected to the heat transfer devices 2a, 2b, 2c in a clamping manner. To achieve this, the holder 4 is provided with positioning and clamping elements 16, 17, between which the heat transfer devices 2a, 2b, 2c are held in a friction-locked manner. The positioning and clamping elements 16, 17 are arranged on the bottom side of the holder 4 in a plurality of rows. These rows extend in transverse direction in relation to the flow direction and are arranged in a staggered manner in relation to each other. That means that a heat transfer device 2a, 2b, 2c is clamped between two rows of positioning and clamping elements 16, 17. Therein, an element 16, 17 of the one row is opposed by a gap between elements 16, 17 of the other row. The clamping elements 16 engage between the heat transfer fins 7. In the exemplary embodiment shown, the clamping elements 16 are approximately formed as rectangular pegs or ribs which are clamped between neighboring heat transfer fins 7. At the same time, the clamping elements 16 serve as a stop for the neighboring heat transfer device 2a or 2b, respectively. The elements 17 can also have a clamping function or only serve as stops for positioning the heat transfer devices 2a, 2b, 2c.

REFERENCE SYMBOLS

1 Vehicle heating system
2a Heat transfer device
2b Heat transfer device
2c Heat transfer device
3 Contact rail
3a Rivet
4 Holder
5 Hole
6 Tube
7 Heat transfer fin
8 Plate
9a Connectors
9b Connectors
10 Heating device
11 Contact plate
11a Bent-off end of the contact plates
12 Heating elements
13 Positioning frame
14 Receptacle for heating elements
15 Insulating lining
16, 17 Positioning and clamping elements
18 Clamping noses

What is claimed is:

1. A vehicle heating system, comprising:
a plurality of heat transfer devices for heating air flowing therethrough, each of the plurality of heat transfer devices comprising an extruded profile in an extrusion direction perpendicular to the air flowing therethrough, and each of the plurality of heat transfer devices comprising a plurality of holes disposed through the extruded profile in a perpendicular direction in relation to the extrusion direction;
at least one heating device attached to each of the plurality of heat transfer devices, said at least one heating device comprising two contact plates between which a single heating element or a single layer of heating elements is arranged, said at least one heating device further comprising two positioning frames each positioning frame being attached to one of the contact plates and each positioning frame holding one of the contact plates by engaging around the longitudinal edges of the contact plate; and
wherein the plurality of heat transfer devices are arranged in series as seen in flow direction where one heat transfer device is in front of or behind another heat transfer device configured for the flow direction to pass in series through the plurality of heat transfer devices.

2. The vehicle heating system according to claim 1, wherein a holder which is attached to the at least one heat transfer device in a clamping manner.

3. The vehicle heating system according to claim 1, wherein the at least one heat transfer device comprises at least one heating device receptacle in which the at least one heating device or one of the heating devices is arranged.

4. The vehicle heating system according to claim 3, wherein the at least one heating device receptacle comprises an opening into which the at least one heating device is inserted.

5. The vehicle heating system according to claim 1, wherein the positioning frames comprise clamping noses for clamping the heating elements.

6. The vehicle heating system according to claim 3, wherein the heating device receptacles are formed as tubes in which the heating devices are inserted.

7. The vehicle heating system according to claim 1, wherein the heating devices of neighboring heat transfer devices are arranged in a staggered manner with respect to the flow direction.

8. The vehicle heating system according to claim 7, wherein the plurality of heat transfer devices are shaped in an equal manner.

9. The vehicle heating system according to claim 1, wherein neighboring heat transfer devices are arranged differently with respect to the flow direction.

10. The vehicle heating system according to claim 1, wherein the contact plates and the positioning frames attached thereto are each shaped in an equal manner.

11. The vehicle heating system according to claim 1, wherein both contact plates of each at least one heating device are electrically isolated from the at least one heat transfer device.

12. The vehicle heating system according to claim 1, wherein both contact plates of each at least one heating device carry an electrically insulating lining on their side facing away from the single heating element or the single layer of heating elements.

13. The vehicle heating system according to claim 1, wherein the at least one heat transfer device comprises the extruded profile which comprises heat transfer fins.

14. A vehicle heating system, comprising:
a plurality of heat transfer devices for heating air flowing therethrough;
at least one heating device attached to the plurality of heat transfer devices, said at least one heating device comprising two contact plates between which a single heating element or a single layer of heating elements is arranged, said at least one heating device further comprising two positioning frames each positioning frame being attached to one of the contact plates and each positioning frame holding a longitudinal edge of one of the contact plates;
wherein the at least one heat transfer device comprises a plurality of heating device receptacles;
wherein a plurality of contact rails extend in a direction that is parallel to a contact surface of the contact plates which contacts the single heating element or the single layer of heating elements electrically, wherein the contact plates of the heating devices are each connected to one of two neighboring contact rails; and
wherein at least one of the contact rails is connected to contact plates of at least two heating devices which are positioned in heating device receptacles of neighboring heat transfer devices, one of said heat transfer devices being behind the other seen in a direction perpendicular to the contact surfaces of the contact plates.

15. The vehicle heating system according to claim 1, wherein the contact plates are bent off at their ends.

16. A vehicle heating system, comprising:
at least one heat transfer device for heating air flowing therethrough;
at least one heating device attached to the heat transfer device, said at least one heating device comprising two contact plates between which a single heating element or a single layer of heating elements is arranged, said heating device further comprising two positioning frames each positioning frame being attached to one of the contact plates by engaging around the longitudinal edges of the contact plate;
wherein both contact plates of each at least one heating device are electrically isolated from the at least one heat transfer device while thermally conductive to the at least one heat transfer device.

* * * * *